United States Patent
Kim et al.

[11] Patent Number: 6,109,652
[45] Date of Patent: Aug. 29, 2000

[54] SHOCK ABSORBING DEVICE FOR STEERING COLUMN

[75] Inventors: Ji-Youl Kim; Young-Moon Park, both of Wonju-Si, Rep. of Korea

[73] Assignee: Mando Corporation, Kyongki, Rep. of Korea

[21] Appl. No.: 08/986,422

[22] Filed: Dec. 8, 1997

[30] Foreign Application Priority Data

Dec. 30, 1996 [KR] Rep. of Korea ............. 96 78225

[51] Int. Cl.[7] .................................................. B62D 1/19
[52] U.S. Cl. ........................................... 280/777; 74/492
[58] Field of Search .......................... 280/777; 188/371; 74/492

[56] References Cited

U.S. PATENT DOCUMENTS

| | | | |
|---|---|---|---|
| 3,487,710 | 1/1970 | Fergle | 188/371 |
| 3,877,319 | 4/1975 | Cooper | 188/371 |
| 5,088,768 | 2/1992 | Maruyama et al. | 280/777 |
| 5,669,633 | 9/1997 | Naff et al. | 280/777 |

FOREIGN PATENT DOCUMENTS 8-40287  2/1996  Japan .

*Primary Examiner*—Peter C. English
*Attorney, Agent, or Firm*—Oblon, Spivak, McClelland, Maier & Neustadt, P.C.

[57] ABSTRACT

A shock absorbing device for a steering column. The shock absorbing device is provided in the interferential fitting junction between the upper and lower columns of the steering column. The shock absorbing device has a plurality of friction members formed on the upper column by a piercing process, with the base part of each friction member facing the outside of the upper column and the remainder being folded down into the internal surface of the upper column to form a friction part. The friction part is brought into frictional contact with the external surface of the lower column, thus increasing the frictional contact surface area of the shock absorbing device. The shock absorbing device effectively absorbs and relieves shock in the initial stage of a car collision, thus effectively preventing the shock from being transmitted to a steering wheel in order to protect the driver in a collision.

4 Claims, 4 Drawing Sheets

SHOCK ABSORBING DEVICE FOR STEERING COLUMN

BACKGROUND OF THE INVENTION

1. Field of the Invention

The present invention relates to a shock absorbing device for a steering column, and more particularly to a shock absorbing device for effectively absorbing and relieving shock applied to a steering column in the initial stage of a car collision, thus effectively preventing the shock from being transmitted to a steering wheel and thereby protecting a driver in the event of a collision.

2. Description of the Prior Art

FIGS. 1 and 2 show the construction of a typical shock absorbing device for a steering column. As shown in the drawings, the steering column comprises a cylindrical upper column 10 and a cylindrical lower column 20, one end of the lower column 20 being interferentially fitted into the upper column 10 to form a shock absorbing device in the interferential fitting junction between the columns 10 and 20. The shock absorbing device includes a plurality of lengthwise lugs 21, which are axially formed with regular spacing on the fitting part of the lower column 20. Due to the lengthwise lugs 21, the lower column 20 is able to be interferentially fitted into the upper column 10. The lengthwise lugs 21 are preferably formed on the lower column 20 by a pressing process.

The upper and lower columns 10 and 20 are respectively mounted to upper and lower portions of a car body using mounting brackets (not shown). In the event of a collision, the lower column 20 frictionally retracts into the upper column 10 so that the junction between the internal surface of the upper column 10 and the lengthwise lugs 21 of the lower column 20 absorb and relieve the collision impact applied to a steering wheel through the steering column. The shock absorbing device thus protects the driver from such a collision impact.

FIG. 3 is a chart showing the impact absorbing characteristic of a typical shock absorbing device of a steering column during a car collision. As shown in FIG. 3, the collision impact load represented in units of kilogram force (kgf), which is absorbed by the junction between the internal surface of the upper column 10 and the lengthwise lugs 21 of the lower column 20, is rapidly increased, reaching a peak point within a very short time after the collision initiates. After reaching the peak point, the absorbed impact load is constant at about 200 kgf, due to a relative displacement (stroke) between the upper and lower columns 10 and 20. Such peaking of the absorbed impact load is caused by the fact that the upper column 10 is only minutely deformed in the initial stage of the retraction of the lower column 20 into the upper column 10, thus preventing the lower column 20 from easily retracting into the upper column 10. This phenomenon results from a relative displacement between the columns 10 and 20 which is extremely small at the peak point of the load. Such a small displacement between the two columns 10 and 20 in the initial stage of the collision means that the collision impact is directly applied to the steering wheel through the steering column.

Therefore, the conventional shock absorbing device for a steering column fails to rapidly and effectively absorb the collision impact in the initial stage of a car collision, and transmits the impact to the steering wheel through the two columns and in turn to the driver. Such a shock absorbing device is ineffective in protecting the driver in the event of a collision.

As described above, the impact load resulting from a car collision is constant after the peak point. However, since a collision impact is instantaneously generated upon collision, the interferential fitting junction between upper and lower columns requires a rapid deformation characteristic to effectively absorb the impact in the initial stage of the collision.

Another problem experienced by a typical shock absorbing device is that it is very difficult to obtain a predetermined size of the lengthwise lugs 21 from the pressing process. Therefore, it is difficult to effectively control the impact load. The steering column with such a shock absorbing device is also problematic in that the upper and lower columns 10 and 20 are welded to a car body, causing a welding strain in each column. Due to this such welding strain, the junction between the internal surface of the upper column 10 and the external surface of the lower column 20 may be deformed, failing to maintain the designed structure of the junction. Therefore, the impact load, which can be effectively absorbed by the shock absorbing device in the case of a collision, cannot be accurately determined.

SUMMARY OF THE INVENTION

In view of the foregoing, it is an object of the present invention to provide a shock absorbing device for a steering column, which effectively absorbs and relieves shock applied to a steering column in the initial stage of a car collision, thus preventing the shock from being transmitted to a steering wheel and to the driver in the event of a collision.

Another object of the present invention is to provide a shock absorbing device for a steering column, which collapses along with a steering column during a car collision, thus reliably absorbing and relieving the shock caused by the collision.

In order to accomplish the above objects, the present invention provides a shock absorbing device provided in the interferential fitting junction between upper and lower columns of a steering column, the lower column being interferentially fitted into the upper column, and adapted for absorbing and relieving a shock applied to the steering column in the initial stage of a car collision, comprising a plurality of friction members formed on the upper column through a piercing process at positions around the interferential fitting junction, each of the friction members being folded down into the internal surface, the upper column to be brought into frictional contact with the external surface of the lower column when the lower column is fitted into the upper column.

Each of the friction members comprises a base part which faces the outside of the upper column and a friction part integrally extending from the base part and folded down into the upper column to be brought into close contact with the interior surface of the upper column. The friction part comes into frictional contact with the external surface of the lower column when the lower column is fitted into the upper column.

The junction between the base part of each friction member and the main body of the upper column is inwardly rounded on opposite sides, thus forming a neck with opposingly concave webs.

In another embodiment, the shock absorbing device also includes a plurality of inward projections, which are formed on the internal surface of the upper column and are brought into frictional contact with the external surface of the lower column.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
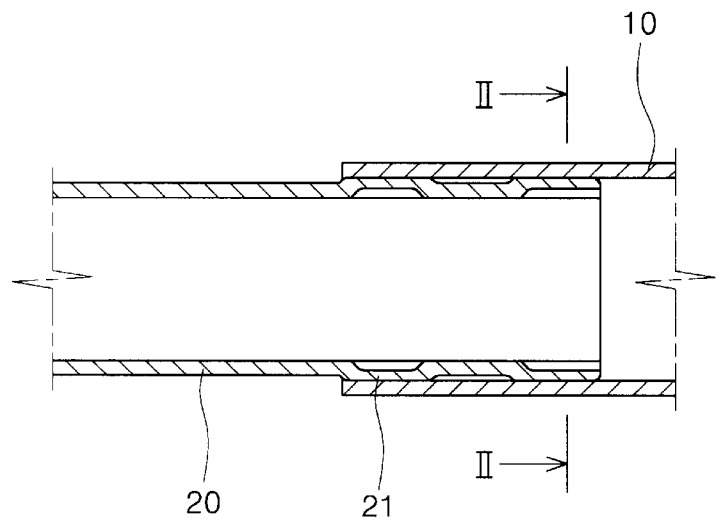
FIG. 1 is a longitudinal-sectional view showing the construction of a conventional shock absorbing device for a steering column.
Figure 2:
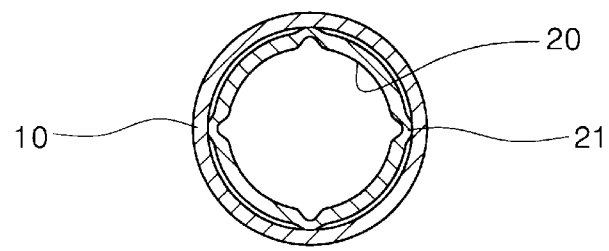
FIG. 2 is cross-sectional view of the shock absorbing device taken along the line II—II of FIG. 1.
Figure 3:
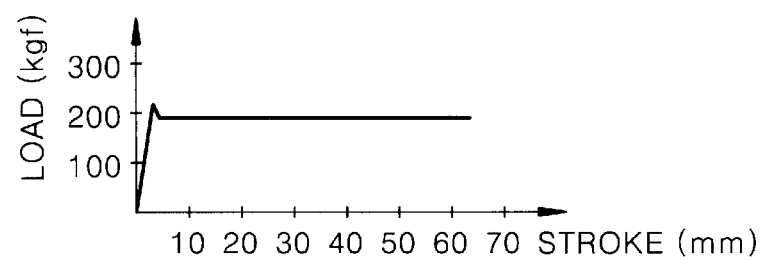
FIG. 3 is a chart showing the impact absorbing characteristic of a typical shock absorbing device during a car collision.
Figure 4:
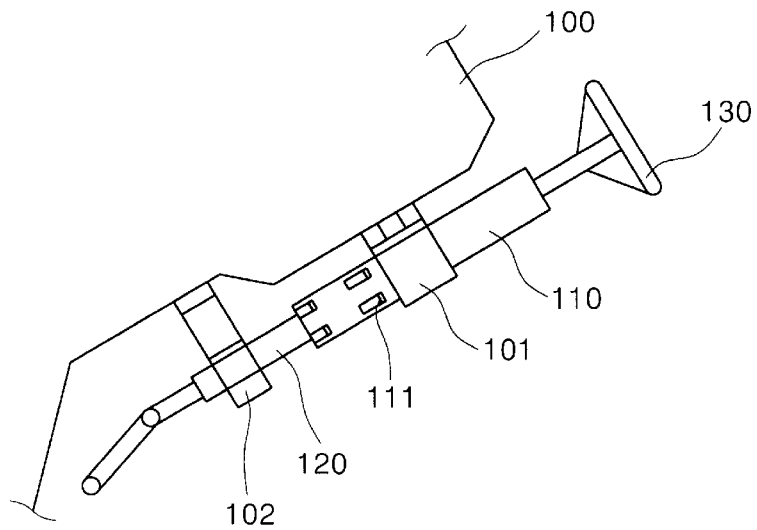
FIG. 4 is a side view of a steering column with a shock absorbing device according to a preferred embodiment of the present invention.

FIG. 4 is a side view of a steering column with a shock absorbing device according to a preferred embodiment of the present invention. As shown in the drawing, two mounting brackets 101 and 102 are welded to upper and lower portions of a car body 100, while upper and lower columns 110 and 120 are welded to the brackets 101 and 102 respectively, one end of the lower column 120 being interferentially fitted into the upper column 110 to form a shock absorbing device in the interferential fitting junction between the two columns. A steering wheel 130 is connected to the top end of the upper column 110.

Figure 5:
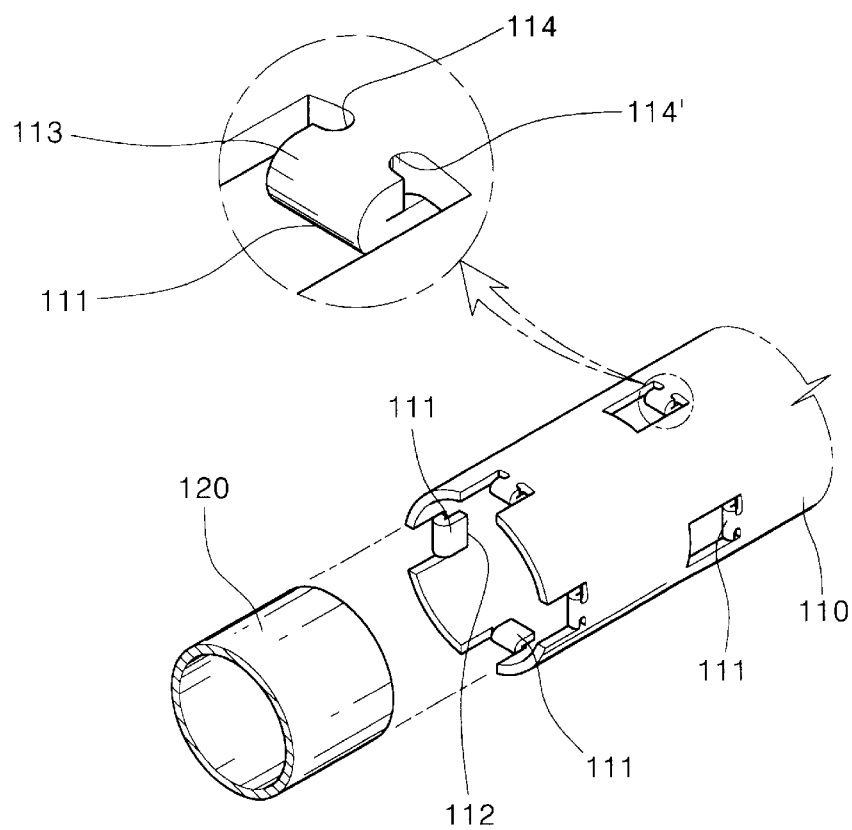
FIG. 5 is a perspective view of the shock absorbing device of the present invention.
Figure 6:
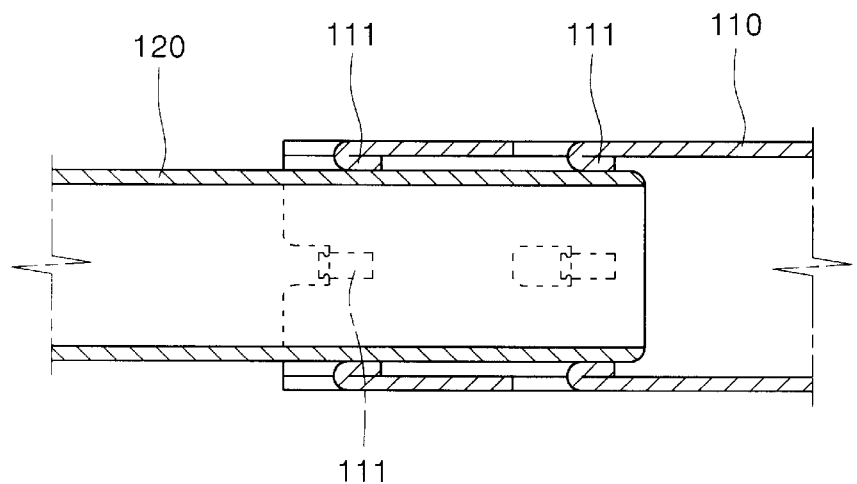
FIG. 6 is a longitudinal-sectional view of the shock absorbing device of the present invention.
Figure 7:
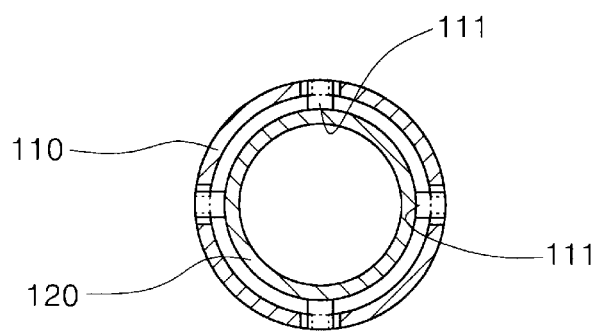
FIG. 7 is a cross-sectional view of the shock absorbing device of the present invention.

As shown in FIGS. 5, 6, and 7, the upper column 110 is a cylindrical body, which is provided with a plurality of friction members 111 on the fitting surface thereof. The number of the friction members 111 varies depending on the type of car.

The friction members 111 are preferably formed on the upper column 110 by a piercing (stamping) process, such that a base part 113 of each friction member 111 faces the outside of the column 110 and the remainder is folded down into the column 110 and against its interior to form a friction part 112. That is, the friction part 112, which integrally extends from the base part 113, is folded inwardly to be positioned under the base part 113. A narrowed junction between the base part 113 and the main body of the column 110 is inwardly rounded on opposite sides, thus forming a neck having oppposingly concave webs 114 and 114'. The webs 114 and 114' of the neck allow each friction member 111 to be easily folded, while preventing cracking and stress concentration at this location. In addition, the webs 114 and 114' allow each friction member 111 to be easily deformed outwardly from the column 110 when the lower column 120 forcibly retracts into the upper column 110 in the initial stage of a car collision.

In the above shock absorbing device, the friction members 111 of the upper column 110 are all brought into frictional contact with the external surface of the lower column 120 by interferentially fitting the lower column 120 into the upper column 110. The friction members 111 thus effectively absorb and relieve the collision impact by the frictional force generated between the members 111 and the external surface of the lower column 120, when the lower column 120 retracts into the upper column 110 in the initial stage of a car collision.

In a preferred embodiment of the present invention, the friction members 111 are circumferentially arranged on the upper column 110 at regular intervals. However, it should be understood that the friction members 111 may be irregularly arranged on the upper column 110.

The operational effect of the above shock absorbing device will be described hereinbelow.

During a collision, the lower column 120 forcibly retracts into the upper column 110 at the interferential fitting junction between the two columns while effectively absorbing and intercepting the impact load before the load is applied to the steering wheel 130.

When the lower column 120 retracts into the upper column 110 in the initial stage of a car collision, the friction members 111 of the upper column 110 absorb the impact load by the frictional force generated between the friction members 111 and the external surface of the lower column 120. That is, the friction members 111 of the upper column 110 and the external surface of the lower column 120 frictionally move relative to each other in the initial stage of the car collision so that the members 111 smoothly absorb the impact load and effectively intercept the load before the load is applied to the steering wheel 130 through the upper column 110.

When the lower column 120 retracts further into the upper column 110 during the collision, the frictional contact area between each friction member 111 and the external surface of the lower column 110 is remarkably increased, thus more effectively absorbing the impact load.

When the lower column 120 forcibly retracts into the upper column 110 in the initial stage of a car collision, each folded friction member 111 deforms at the base part 113 toward the outside of the upper column 110 to absorb part of the impact load. In the above state, the webs 114 and 114' formed on the neck of each friction member 111 allow the member 111 to be easily deformed.

Figure 8:
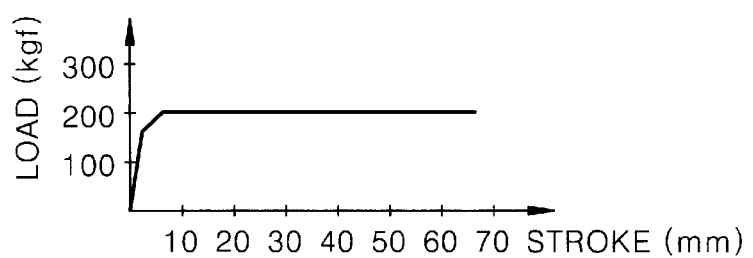
FIG. 8 is a chart showing the impact absorbing characteristic of the shock absorbing device of the present invention during the collision.

FIG. 8 is a chart showing the impact absorbing characteristic of the shock absorbing device of the present invention during a collision. As shown in FIG. 8, the shock absorbing device of the present invention absorbs and relieves the impact load applied to the steering column in the initial stage of a car collision, without exceeding an impact load of 200 kgf. Therefore, the present invention differs from the conventional device since no peaking occurs. This elimination of the peaking phenomenon results from the friction members 111, which deform toward the outside of the upper column 110 in the initial stage of the collision.

In the shock absorbing device of the present invention, a gap, which is equal to the material thickness of each friction member 111, exists in the interferential fitting junction between the upper and lower columns 110 and 120. Due to the existence of such a gap in the junction between the columns 110 and 120, the impact absorbing capacity of the shock absorbing device is not altered, irrespective of any welding strain caused by a welding process for welding the columns 110 and 120 to the mounting brackets 101 and 102. Therefore, the shock absorbing device of this invention effectively maintains the predetermined impact absorbing capacity regardless of such a welding process.

Figure 9:
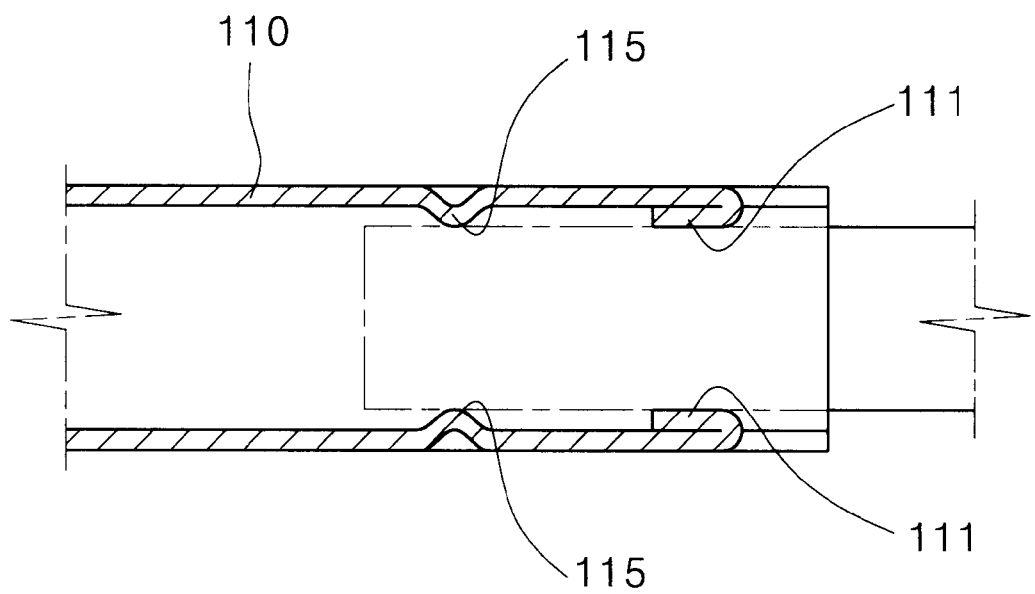
FIG. 9 is a longitudinal-sectional view of a shock absorbing device for a steering column according to another embodiment of the present invention.

FIG. 9 is a longitudinal-sectional view of a shock absorbing device for a steering column according to the second preferred embodiment of the present invention. In the shock absorbing device of this embodiment, the upper column 110 includes a plurality of inward projections 115 in addition to the friction members 111, with the friction members 111 absorbing a primary impact load during collision and the inward projections 115 absorbing a secondary impact load.

As described above, the present invention provides a shock absorbing device for a steering column. The shock absorbing device is provided in the interferential fitting junction between the upper and lower columns of a steering column. The shock absorbing device comprises a plurality of friction members, which are formed on the upper column by a piercing process. In each friction member, the base part faces the outside of the upper column, while the remainder is folded down into the upper column to form a friction part. The friction part of each friction member is brought into frictional contact with the external surface of the lower column, thus increasing the frictional contact surface area of the shock absorbing device. The shock absorbing device effectively absorbs and relieves shock applied to the steering column in the initial stage of a car collision, thus preventing the shock from being transmitted to a steering wheel in order to protect the driver in a collision.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A shock absorbing device provided in an interferential fitting junction between upper and lower columns of a steering column, with the lower column being interferentially fitted into the upper column, and adapted for absorbing and relieving shock applied to the steering column in the initial stage of a collision, comprising:

a plurality of friction members formed on the upper column by a piercing process at positions around the interferential fitting junction, each of said plurality of friction members being folded down into the upper column to be brought into frictional contact with an external surface of the lower column when the lower column is fitted into the upper column, wherein each of said plurality of friction members comprises:

a base part exposed facing the outside of the upper column; and a friction part integrally extending from said base part and folded down into the upper column to be brought into close contact with an internal surface of the upper column, said friction part coming into frictional contact with the external surface of the lower column when the lower column is fitted into the upper column.

2. The shock absorbing device according to claim 1, further comprising:

a narrowed junction between said base part of each of said plurality of friction members and a main body of the upper column is inwardly rounded on opposite sides, to form a neck having opposingly concave webs.

3. The shock absorbing device according to claim 2, further comprising:

a plurality of inward projections formed on the internal surface of the upper column and brought into frictional contact with the external surface of the lower column.

4. The shock absorbing device according to claim 1, further comprising:

a plurality of inward projections formed on the internal surface of the upper column and brought into frictional contact with the external surface of the lower column.

* * * * *